United States Patent [19]

Holster et al.

[11] 4,219,321
[45] Aug. 26, 1980

[54] DEVICE FOR MAKING DISCS

[75] Inventors: Peter L. Holster; Adam Ooms, both of Eindhoven, Netherlands

[73] Assignee: U.S. Philips Corporation, New York, N.Y.

[21] Appl. No.: 14,394

[22] Filed: Feb. 23, 1979

[30] Foreign Application Priority Data

Dec. 21, 1978 [NL] Netherlands .................. 7812387

[51] Int. Cl.² .................. B29C 17/00; B25D 17/00; B30B 18/34
[52] U.S. Cl. .................. 425/384; 425/407; 425/810
[58] Field of Search .................. 425/405 H, 384, 407, 425/810, 29, 30

[56] References Cited

U.S. PATENT DOCUMENTS

| | | | |
|---|---|---|---|
| 1,942,251 | 1/1934 | Mains | 425/384 X |
| 2,204,531 | 6/1940 | Erbguth et al. | 425/29 |
| 2,501,823 | 3/1950 | Leedom | 425/384 X |
| 2,536,506 | 1/1951 | Kleber | 425/810 |
| 2,552,458 | 5/1951 | Reiskind et al. | 425/810 |
| 2,998,622 | 9/1961 | Senoux | 425/810 |
| 3,329,748 | 7/1967 | Hugger | 425/29 X |
| 3,579,626 | 5/1971 | Brittain | 425/30 X |
| 3,594,867 | 7/1971 | Pfeiffer | 425/384 X |
| 3,918,875 | 11/1975 | Phillipson et al. | 425/810 |
| 3,941,547 | 3/1976 | Hunyar et al. | 425/407 |
| 3,954,363 | 5/1976 | Hunyar | 425/810 |
| 4,003,687 | 1/1977 | Hedin | 425/407 X |
| 4,140,050 | 2/1979 | Giddings | 425/384 X |

FOREIGN PATENT DOCUMENTS 1808144 6/1970 Fed. Rep. of Germany ...... 425/405 H

Primary Examiner—J. Howard Flint, Jr.
Attorney, Agent, or Firm—Thomas A. Briody; William J. Streeter; Simon L. Cohen

[57] ABSTRACT

A device for making discs, comprising a press which includes at least one hydraulic pressure chamber, one wall of which is formed during operation by a flexible, thermally conductive plate which can be pressed against a thermoplastic substrate. The device comprises a first system of ducts which includes a pump whereby a hot liquid can be supplied to and discharged from the pressure chamber, and a second system of ducts which includes a pump whereby cold liquid can be supplied to the pressure chamber. The liquid in the systems of ducts and the pressure chamber is pressurized by means of an expansion vessel, the liquid part of which communicates with the pressure chamber as well as with both systems of ducts, its gas part communicating with a pressure control device.

8 Claims, 3 Drawing Figures

DEVICE FOR MAKING DISCS

The invention relates to a device for making discs, comprising a press which includes a hydraulic pressure chamber, one wall of which is formed during operation by a flexible, thermally conductive mould having contours which can be impressed in a thermoplastic material, the device furthermore comprising a first system of ducts which includes a pump whereby a hot liquid can be supplied to and discharged from the pressure chamber and a second system of ducts which includes a pump whereby a cold liquid can be supplied to and discharged from the pressure chamber, means being provided for keeping the liquid in the systems of ducts and the pressure chamber pressurized.

A device of the described kind is known from German Offenlegungsschrift No. 2,308,843. Each of the said systems of ducts of this known device for pressing discs consists of a circulation duct which includes a valve which interconnects the inlet and outlet side of the pump, a duct which comprises a valve which connects the high-pressure side of the circulation duct to the pressure chamber, and a duct which connects the outlet of the pressure chamber to the circulation duct via said valve in the circulation duct. By suitable operation of the valves, hot and cold liquid, respectively, can be alternately pumped through the pressure chamber. The large number of valves makes the device complex, expensive and difficult to operate.

In order to ensure that adequate pressure prevails in said systems of ducts and the pressure chamber, a separate pressure source is present. An expansion vessel is provided to collect expanding liquid in the hot system of ducts when this system is not connected to the mould.

This means that each time some hot liquid disappears from the system to the expansion vessel and that this liquid must be replenished again by the pressure source at a later stage. This means a given loss of energy.

The invention has for its object to provide a device for pressing discs which has a simple, compact construction and which is fully closed, so that loss of liquid from this system, and the subsequent returning of liquid, no longer occur.

To this end, the device in accordance with the invention is characterized in that the means for keeping the liquid pressurized are formed by an expansion vessel the liquid part of which communicates with the pressure chamber as well as with the two systems of ducts, the gas part of said expansion vessel communicating with a pressure control device.

The expansion vessel of the device in accordance with the invention is capable of compensating for volume variations of the liquid which are caused by temperature fluctuations in the system; at the same time, a suitable choice of the pressure in the expansion vessel enables control of the pressure in both systems of ducts and the pressure chamber. Thus, a simpler construction offers a large saving as regards the numbers of valves to be operated.

In another embodiment of the device in accordance with the invention, the liquid level in the expansion vessel is chosen so that the static pressure of the liquid corresponds to the required minimum pressure in the pressure chamber. Thus, when the mould is in the open condition, the pressure in the gas part of the expansion vessel may be the atmospheric pressure, while for the operating pressure a pressure source producing the desired pressure is connected.

This makes pressure control very simple.

A further embodiment of the device in accordance with the invention is characterized in that each of the two systems of ducts is in open communication with the pressure chamber, the desired liquid flow being obtained by alternating activation of one of the two pumps. Thus, the systems of ducts no longer include any valves, and the hot or cold liquid is alternately pumped through the pressure chamber.

In another embodiment yet, the device comprises a six-way valve whereby alternately the ends of one of the systems of ducts can be connected to the inlet and outlet of the pressure chamber and the ends of the other system of ducts can be interconnected or vice versa.

In this embodiment, the pumps thus operate continuously and the systems of ducts are alternately connected to the pressure chamber.

In a further embodiment of the device in accordance with the invention, the supply of liquid to and the discharging of liquid from the pressure chamber take place via a distribution block which opens on the one side centrally, into the pressure chamber by way of a first central duct and a first annular duct which is situated therearound, and on the other side into the liquid supply duct and discharge duct by way of a second central duct and a second annular duct which is situated therearound, the first central duct being connected to the second annular duct and the first annular duct being connected to the second central duct.

It is thus achieved that the supply to as well as the discharging of liquid from the pressure chamber takes place from a central point, so that flow differences, notably temperature differences, over the circumference of the pressure chamber are minimized.

In another embodiment yet, the pressure chamber is sub-divided by a liquid guide plate to form two compartments which communicate with each other around the edge of the plate, so that the liquid on the one side of the plate flows from the center to the circumference and on the other side from the circumference to the center, the plate having a thermal resistance such that there is substantially no temperature difference in the liquid flow between center and circumference.

The thermal resistance of the plate is determined by its material and its thickness. By a suitable choice of these two parameters, such exchange of heat is realized between the two liquid flows that temperature differences are substantially eliminated.

The invention will be described in detail hereinafter with reference to the accompanying diagrammatic drawing.

Figure 1:
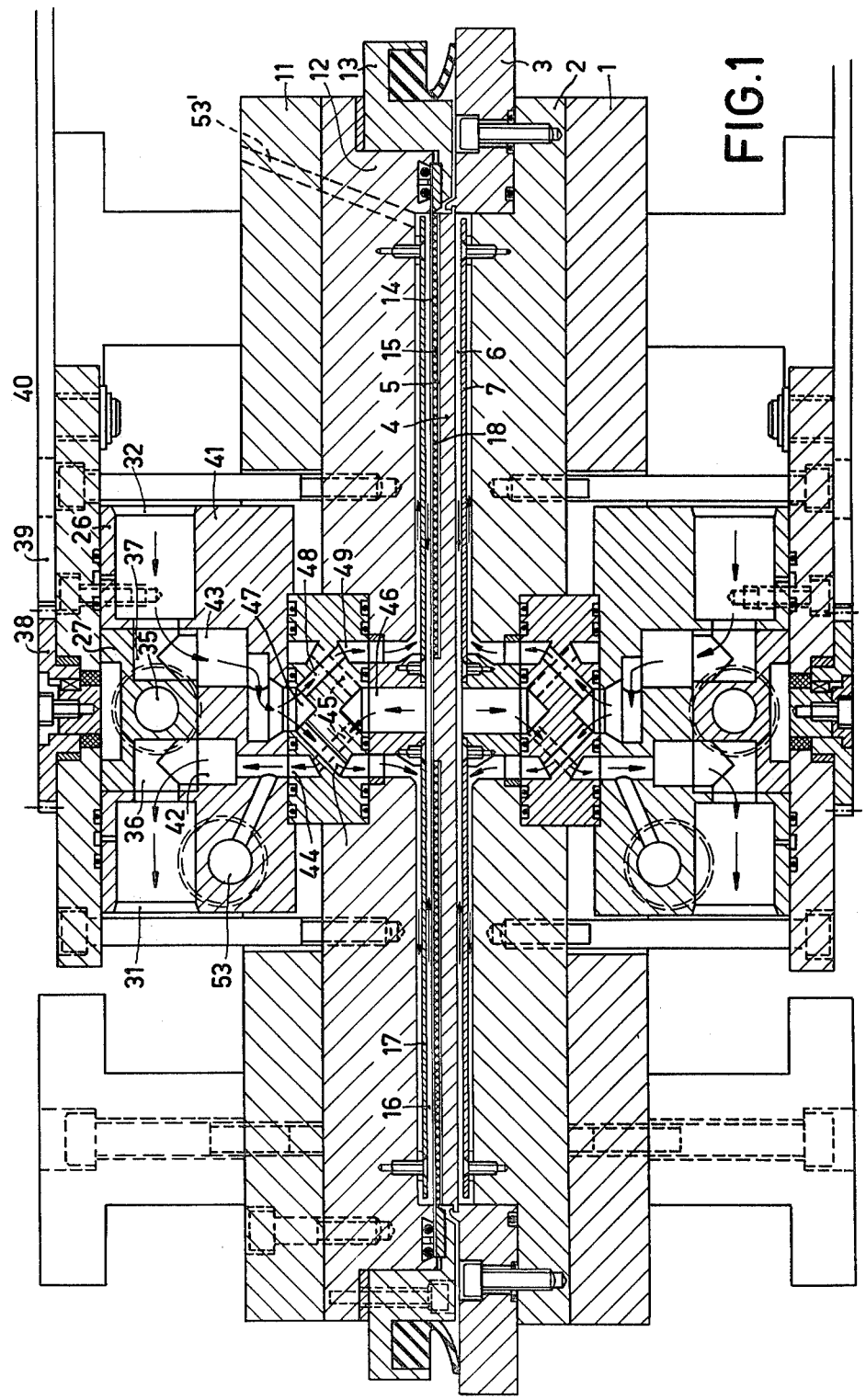
FIG. 1 shows an embodiment of a device for pressing discs.
Figure 2:
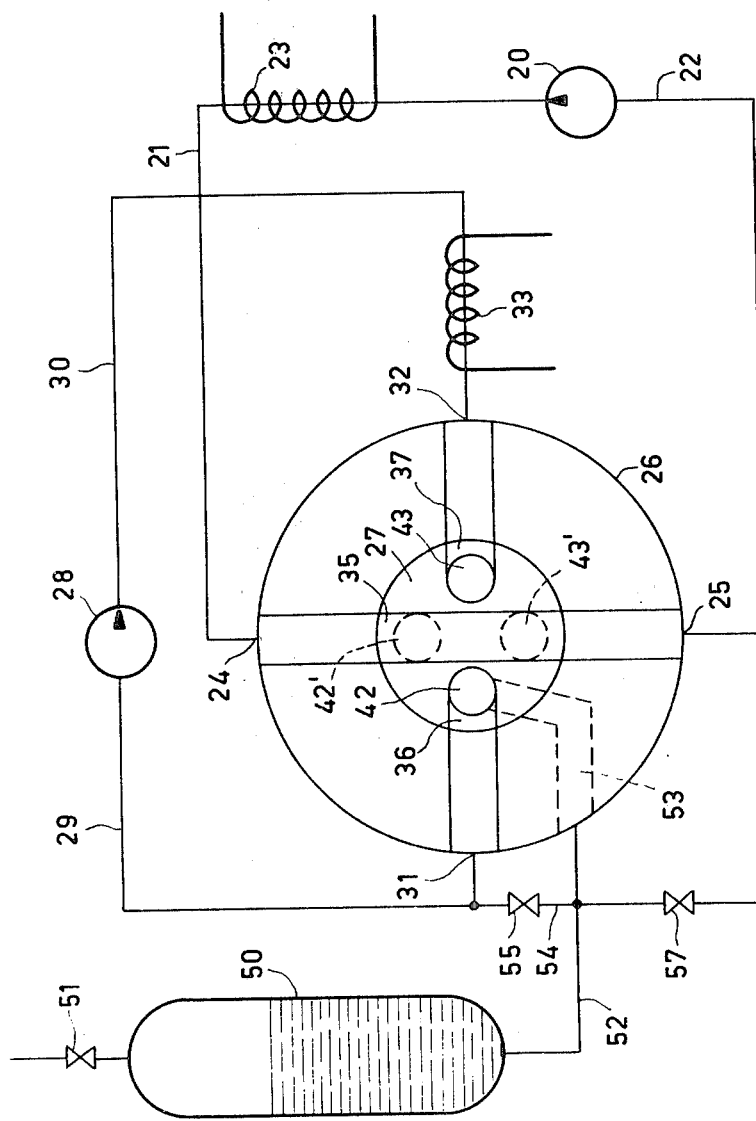
FIG. 2 shows the liquid circuit whereby liquid can be circulated through one of the pressure chambers of the device shown in FIG. 1.

The reference numeral 1 in FIG. 1 denotes a base plate. On this base plate a second plate 2 is mounted which supports, by means of fixing and sealing means 3, a thermally suitably conductive plate 4 on which a thin mould 5 comprising the contours of the discs to be pressed is arranged. Between the plate 2 and the plate 4 a pressure chamber 6 is located wherethrough hot and cold pressurized liquid can be alternately conducted by means of the means to be described hereinafter. The pressure chamber 6 also accommodates a guide plate 7 for guiding the liquid flow.

The upper side of the device is roughly of the same construction as the described lower side and also comprises two interconnected plates 11 and 12. Between the plate 12 and the sealing and clamping means 13 a flexible, thermally suitably conductive finishing plate 14 is provided. For the pressing of discs which are provided with contours on both sides, a mould can be used instead of this finishing plate. Between the mould 5 and the finishing plate 14 there is provided a substrate 15 of a synthetic material in which the information is to be impressed. Between the plate 14 and the plate 12 a pressure chamber 16 is located in which a guide plate 17 is arranged for guiding the pressurized liquid flowing therethrough.

Pressurized liquid can be applied to both pressure chambers 6 and 16 by means of an hydraulic system. Both systems are fully identical, so that only the system associated with the pressure chamber 16 will be described. The liquid system comprises a circuit for circulating hot liquid and a circuit for circulating cold liquid. The first circuit is formed by a pump 20, a supply duct 21 and a discharge duct 22. The supply duct 21 comprises a heating device 23. The supply duct 21 communicates with a port 24 and the discharge duct 22 communicates with a port 25 of the housing 26 of a six-way valve. The second circuit is formed by a pump 28, a supply duct 29 and a discharge duct 30. The supply duct 29 opens into a port 31 and the discharge duct 30 opens into a port 32 of the valve housing 26. The discharge duct 30 includes a cooling device 33.

The rotatable valve portion 27 comprises three ducts 35, 36 and 37, the duct 35 interconnecting two diametrically oppositely situated points. Each of the ducts 36 and 37 connects a point on the circumference of the valve portion 27 to a point on the lower side thereof.

The valve portion 27 has connected to it a gearwheel 38 which engages a gearwheel 39 which is capable of rotation around a point 40.

The lower side of the valve porion 27 communicates with a block 41 which comprises four ducts 42, 42' and 43, 43'. The ducts 42 and 42' both open into a second annular duct 44 which is connected, via ducts 45, to the first central duct 46. The ducts 43 and 43' open into a second central duct portion 47 which is connected via ducts 48, to the first annular duct 49.

The annular duct 49 and the central duct 46 both open into the pressure chamber 16. The device furthermore comprises an expansion vessel 50, the gas part of which can be connected as desired, via a valve 51, to a pressure source which delivers the maximum pressure required for pressing and a low pressure source which delivers the minimum pressure. The liquid part of the expansion vessel is connected, via a duct 52, to a duct 53 which is connected to the annular duct 44 and hence to the pressure chamber 16. In given circumstances, a direct connection between the pressure vessel 50 and the pressure chamber 16 will be preferred. This can be realized, for example, as denoted by broken lines, via a duct 53' which opens into the vessel 50.

The duct 52 is furthermore connected, via a duct 54 which includes a resistance 55, to a duct 29 of the cold circuit and, via a duct 56 which includes a resistance 57, to the duct 22 of the hot circuit The operation of this device is as follows.

The pumps 20 and 28 continuously circulate liquid.

Due to the rotation of the gearwheel 40, the gearwheel 38, and hence the valve 27, is set to a given position. When a substrate is newly introduced and the mould is closed, this will be the position in which the ducts 36 and 37 communicate with the ports 25 and 24 and the duct 35 interconnects the ports 31 and 32.

At the same time, the expansion vessel is connected to a pressure source by means of the valve 51.

The pump 20 then pumps liquid through the heating device and through the duct 21, via the port 24 and the ducts 37, 43, 47, 48, to the annular duct 49 wherefrom it enters the pressure chamber 16. In this chamber, the liquid flows around the plate 17, along the finishing plate 14 where heat is given off to the substrate, to the outlet, the central duct 46. The liquid flows further through the ducts 45, 44, 41 and 36 to the port 25 and through the duct 22 back to the pump 20 again. It is to be noted that supply takes place from the central duct 47 while the discharge also takes place via a central duct 46. Thus, differences in the flow of liquid through the pressure chamber are minimized. The plate 17 has a thermal resistance such that a suitable exchange of heat between the liquid flows on either side of the plate is ensured, so that substantially no difference in temperature occurs between the center and the circumference of the pressure chamber.

Meanwhile, the pump 28 circulates liquid through the duct 29, the port 31, the duct 35, the port 32, through the cooling device 33 and back through the duct 30 to the pump 28.

The pressure throughout the system then equals that in the expansion vessel 50.

A volume reduction of the liquid in the cold circuit is compensated for by liquid from the expansion vessel 50 via the duct 54.

After the pressing of the substrate, the valve 27 is turned to the position shown by means of the gearwheels 40 and 38.

The pump 28 then pumps cold liquid through the duct 30, the port 32, the ducts 37, 43, 47 and the annular duct 49, through the pressure chamber 16, thus cooling the substrate, to the central duct 46 and further through the ducts 45, 44, 42 and 36 and through the cooling device 33 to the duct 29 and back to the pump 28.

During this time, the pump 20 circulates hot liquid through the circuit 21, 24, 35, 25 and 22.

The pressure of the liquid is still given by the pressure in the expansion vessel 50 and the volume increase of the liquid in the hot circuit (due to the temperature rise) can flow off to the expansion vessel via the duct 56.

Figure 3:
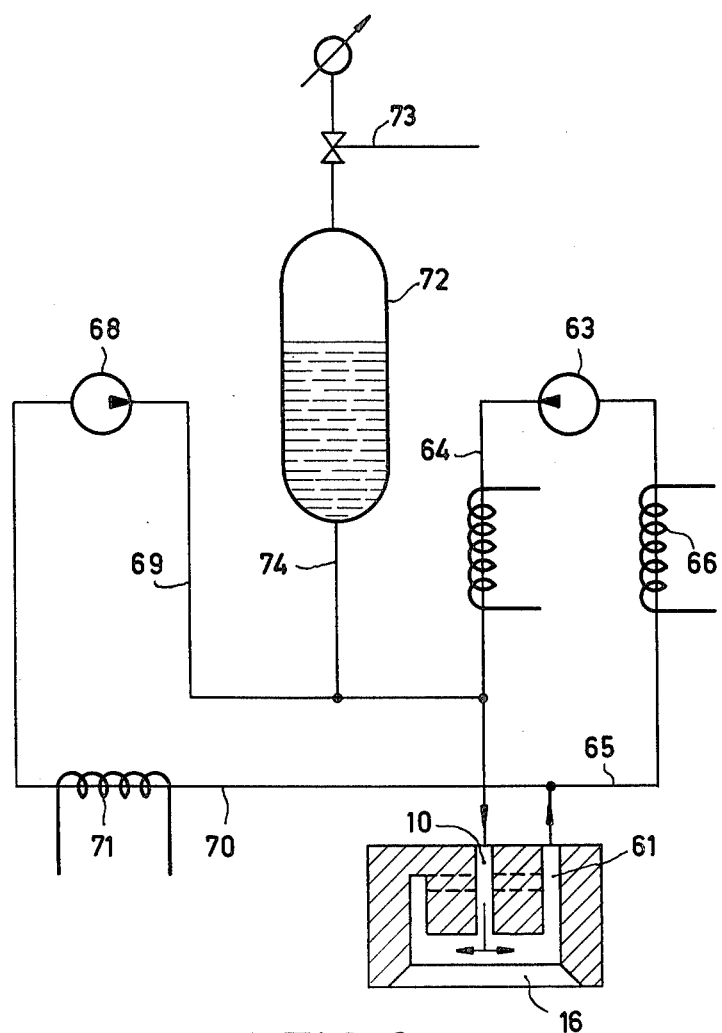
FIG. 3 shows a device for pressing discs which comprises a slightly modified hydraulic circuit for circulating the liquid.

FIG. 3 diagrammatically shows a part of a pressing device in a simplified form, in which the valve 27 is omitted and the liquid flow is forced through the pressure chamber 16 by alternately switching the liquid pumps on and off. The reference numeral 16 in this Figure again denotes the pressure chamber which comprises a liquid inlet 60 and a liquid outlet 61.

The device furthermore comprises a hot liquid circuit which consists of a pump 63, a duct 64 which opens into liquid inlet 60, and a duct 65 which includes a heating device 66 and which connects the liquid outlet 61 to the intake side of the pump 63.

The device furthermore comprises a cold liquid circuit, comprising a pump 68 which opens, via a duct 69, into the liquid inlet 60 and a duct 70 which includes a cooling device 71 and which connects the liquid outlet 61 to the intake side of the pump 68. Via a valve 73, an expansion vessel 72 can be connected to a pressure source or the atmosphere or, if desired for the process, to a vacuum, and its liquid part communicates, via a duct 74, with the duct 69 so that it is in open communication with the cold circuit as well as with the hot circuit and the pressure chamber.

The operation of this device is as follows.

When the pump 63 is switched on, while the pump 68 is not driven, the hot liquid is pumped through the duct 64, the pressure chamber 16, the duct 65 and the heating device 66.

The liquid in the cold circuit is then stationary.

The pressure is maintained throughout the system by the pressure in the expansion vessel 72.

Any volume increase or reduction of the liquid by temperature fluctuations is compensated for by the liquid in the expansion vessel 72.

After some time, the pump 63 is stopped and the pump 68 is driven, with the result that cold liquid starts to flow through the duct 69, the pressure chamber 16 and the duct 70.

The liquid in the hot circuit is then stationary.

In both embodiments described, the pressure is controlled by connecting the expansion vessel 50, 72, by means of the valve 51, 73 respectively, to either a high pressure source or a low pressure source. The latter may be omitted by adjusting the liquid level in the expansion vessel to such a level that the static liquid pressure is sufficient for the minimum required pressure in the pressing device, so that the ends of one of the systems of ducts can be alternately connected to the inlet and outlet of the pressure chamber and the ends of the other system of ducts can be connected to each other and vice versa.

What is claimed is:

1. A device for making discs, comprising a press which includes at least one hydraulic pressure chamber, one wall of which is formed during operation by a flexible, thermally conductive plate which can be pressed against a thermoplastic substrate, the device furthermore comprising a first system of ducts which includes a pump whereby a hot liquid can be supplied to and discharged from the pressure chamber and a second system of ducts which includes a pump whereby a cold liquid can be supplied to and discharged from the pressure chamber, there being provided means for keeping the liquid in the systems of ducts and the pressure chamber pressurized, characterized in that the means for keeping the liquid pressurized are formed by an expansion vessel, the liquid part of which communicates with the pressure chamber as well as with the two systems of ducts, the gas part of said expansion vessel communicating with a pressure control device.

2. A device as claimed in claim 1, characterized in that the liquid level in the expansion vessel is chosen so that the static liquid pressure corresponds to the required minimum pressure in the pressure chamber.

3. A device as claimed in claim 1, characterized in that each of the two systems of ducts is in open communication with the pressure chamber, the desired liquid flow being obtained by alternating activation of one of the two pumps.

4. A device as claimed in claim 1, characterized in that the device comprises a six-way valve.

5. A device as claimed in claim 2, characterized in that each of the two systems of ducts is in open communication with the pressure chamber, the desired liquid flow being obtained by alternating activation of one of the two pumps.

6. A device as claimed in claim 2, characterized in that the device comprises a six-way valve.

7. A device as claimed in any one of the preceding claims, characterized in that the supply of liquid to and the discharging of liquid from the pressure chamber take place via a distribution block which on the one side centrally opens into the pressure chamber by way of a first central duct and a first annular duct which is situated therearound, and on the other side into a liquid supply duct and discharge duct by way of a second central duct and a second annular duct which is situated therearound, the first central duct being connected to the second annular duct and the first annular duct being connected to the second central duct.

8. A device as claimed in any one of claims 1–6, characterized in that the pressure chamber is subdivided by a liquid guide plate to form two compartments which communicate with each other around the edge of the plate, so that the liquid on the one side of the plate flows from the center to the circumference and on the other side of the plate from the circumference to the center, the plate having a thermal resistance such that there is substantially no temperature difference in the liquid flow between center and circumference.

* * * * *